United States Patent [19]
Ohba et al.

[11] Patent Number: 5,668,945
[45] Date of Patent: Sep. 16, 1997

[54] DATA SECURITY APPARATUS AND METHOD

[75] Inventors: Toshihiro Ohba; Toshinori Asai, both of Tokyo, Japan

[73] Assignee: Sega Enterprises, Ltd., Tokyo, Japan

[21] Appl. No.: 393,055

[22] Filed: Feb. 23, 1995

[30] Foreign Application Priority Data

Feb. 28, 1994 [JP] Japan .................. 6-030590

[51] Int. Cl.⁶ ........................................... G06F 11/34
[52] U.S. Cl. .................. 395/186; 380/23; 463/29
[58] Field of Search .................. 395/186, 188.01; 380/4, 23; 364/286.4, 286.5, 286.6; 463/1, 29

[56] References Cited

U.S. PATENT DOCUMENTS

| | | | |
|---|---|---|---|
| 4,937,864 | 6/1990 | Caseiras et al. | 380/18 |
| 5,191,611 | 3/1993 | Lang | 380/25 |
| 5,371,792 | 12/1994 | Asai et al. | 380/3 |
| 5,400,319 | 3/1995 | Fite et al. | 369/275.5 |
| 5,460,374 | 10/1995 | Owaki | 380/4 |
| 5,479,612 | 12/1995 | Kenton et al. | 395/186 |
| 5,490,216 | 2/1996 | Richardson, III | 380/4 |

FOREIGN PATENT DOCUMENTS

| | | | |
|---|---|---|---|
| 389184 | 9/1990 | European Pat. Off. | G06F 15/40 |
| 0449242 | 3/1991 | European Pat. Off. | G06F 11/00 |
| 9103011 | 3/1991 | WIPO | G06F 1/00 |

Primary Examiner—Robert W. Beausoliel, Jr.
Assistant Examiner—Albert Decady
Attorney, Agent, or Firm—Price, Gess & Ubell

[57] ABSTRACT

A data security apparatus and method permits programmed data stored in a replaceable external storage medium to be processed by the data processor when it is determined that a security code is stored on the external storage medium and a replacement second external storage medium is available. The data can then be transferred under a controlled process without performing a security check on the second external storage medium. A hardware security apparatus can therefore be disabled to permit authorized game developers to test their games on an actual game system.

18 Claims, 5 Drawing Sheets

| DISC-ID 1b |
| PROGRAM DATA 1d |

TRIAL CD 1

| SPECIAL CODE 2a |
| KEY-ID 2b |
| KEY-CD DATA 2c |
| PROGRAM DATA 2d |

KEY-CD 2

FLAG STORAGE MEANS 7

| SECURITY FLAG 7a |
|---|
| READOUT ENABLING FLAG 7b |

SPECIAL CODE 18a
PROGRAM DATA 18d

COMMERCIAL CD 18

DATA SECURITY APPARATUS AND METHOD

BACKGROUND OF THE INVENTION

1. Field of the Invention

The present invention relates to a data security apparatus for providing protection of the contents of a ROM storing, e.g., game program data against any illegal execution, copy or analysis.

2. Description of the Related Arts

Early simple video game machines allowed users to play only a single video game realized by game program data stored in a memory fixedly arranged within the machine body. However, recently developed and widespread game machines tend to include a removable ROM which has stored game program data so that the users can play variously different games merely by replacing the ROM with another. Such a ROM can be of a cartridge type like a ROM cartridge in which a dedicated circuit is enclosed in a small case, or alternatively be in the form of a CD-ROM using an optical storage medium, which are fully utilized depending on their respective advantages.

The ROM cartridge or CD-ROM storing an extremely popular game program may be often marketed at a high price since the supply is unlikely to catch up with the demand for that article. For this reason, a case just goes on and on where the contents of the ROM are unlawfully copied and put on the market. Furthermore, in the case of arcade game machines in game centers, a ROM board composed of a circuit overlying a substrate is used as the game program storage ROM. Due to its removability from the machine body, such a ROM board may also be possibly subjected to a risk that the contents thereof are copied and stolen for business use.

In order to deal with this, typical ROM data undergo an analysis or copy limitation processing, while simultaneously the game machine is provided with a data security device for limiting the execution of a game program stored in the ROM which has not undergone that processing. Description will now be given of such a data security device, by way of example, fitted to a game machine for CD-ROM's.

First of all, data stored in a commonly marketed CD-ROM (hereinafter referred to as a commercial CD) have the following configuration. In a commercial CD 18, as shown in FIG. 7, game program data 18d are stored with the insertion of a special code 18a not permitting any analysis or copy without using a dedicated apparatus.

A computer of a commercial game machine, on the other hand, is equipped with a security check means for checking the presence or absence of the special code 18a in the commercial CD 18 to permit only a program with the special code 18a to be executed. Thus, as long as it is a regular commercial CD 18 with the special code 18a inserted therein, the execution of its program data 18d is permitted by the security check means so that the game program data 18d can be executed by use of the normal commercial game machine. Even though a commercial CD 18 includes illegally copied program data 18d, the special code 18a is not permitted to be copied onto the CD, and hence an attempt to execute the program data 18d within in the CD by a commercial game machine will be in vain due to the presence of the security check means.

Nevertheless, the conventional data security apparatus as described above involved the following problems. Although the contents of game program data are to be securely protected from any illegal copy, analysis or execution by persons not having a legitimate title, it is convenient for a regular developer of the game program (namely a person having the legitimate title) to ensure an easy execution of the contents since he must check at all times how the created game is executed. A machine used for the check is preferably a commercial one identical in type to the machines actually manipulated by users, rather than a dedicated one which would require an additional cost for fabrication. Also in terms of checking whether the game can be played with a pleasure from the users' viewpoint, it is desirable to perform the check with a commercial game machine.

As described hereinabove, however, the commercial game machine is typically fitted with the security check means for checking the presence or absence of a special code, with the result that the machine will not permit the execution of a game program without a special code under development. Moreover, the special code has an extremely complicated configuration so as to prohibit any analysis or copy, and hence will take significant time and labor to create. Accordingly, creation of a further special code, if needed each time a new game software is developed, might possibly delay the development of game programs.

SUMMARY OF THE INVENTION

The present invention was conceived to solve the problems involved in the prior art as described above. It is therefore the object of the present invention to provide a data security apparatus ensuring a secure prevention of illegal execution, analysis, or copy of the data by a person having no legitimate title, while simultaneously facilitating the execution of the data by a legitimately entitled person.

1. Means for Solving the Above Problems

In order to achieve the above object, according to an aspect of the present invention defined in claim 1, there is provided a data security apparatus intended to be provided in a data processor for processing main data, the apparatus including an input means for inputting the main data from a main data storage medium, a data execution means for executing the main data input through the input means, a main data readout means, and a security check means for permitting the readout means to read out only the main data which have undergone a predetermined processing, the data security apparatus comprising a release means for releasing a readout means control function of the security check means on the basis of release data for releasing the readout means control function of the security check means, the release data being input through the input means from a release data storage medium.

According to an aspect of the present invention defined in claim 2 dependent on claim 1, preferably, the main data storage medium and the release data storage medium are removably provided in the data processor.

According to an aspect of the present invention defined in claim 3 dependent on claim 2, preferably, the main data storage medium and the release data storage medium store coincident or uncoincident ID data. The data security apparatus may further comprise an ID detection means for detecting ID data input through the input means, an ID storage means for storing the ID data detected by the ID detection means, and an ID collation means for allowing the main data readout means to be actuated only when the ID data stored in the main data storage medium are coincident with the ID data stored in the release data storage medium.

According to an aspect of the present invention defined in claim 4 dependent on claim 3, preferably, the release means includes a flag for controlling an actuation of the function of the security check means, and a flag storage means for storing the flag.

According to an aspect of the present invention defined in claim 5 dependent on claim 4, preferably, the main data are game program data, and that the data processor is a game machine having a computer. The release means, the flag storage means, the ID detection means, the ID storage means and the ID collation means may be implemented on the computer of the game machine.

According to an aspect of the present invention defined in claim 6 dependent on claim 5, preferably, the main data storage medium and the release data storage medium are each a CD-ROM, and the input means is a CD-ROM drive.

2. Operation

The operation of the present invention thus configured is as follows. In the invention as defined in claim 1, upon inputting main data through the input means from the main data storage medium, the release means will release the readout means control function of the security check means. Then, if the main data are input through the input means from the main data storage medium, the readout means will read out the main data which is in turn transferred to the execution means. As a result, by previously inputting the release data, it is possible to execute even main data not subjected to a predetermined processing.

In the invention as defined in claim 2, the main data storage is removably provided in the data processor so as to allow an extensive utilization by the user. In case the main data in such storage medium are ones not subjected to a predetermined processing due to the circumstances such as, for example, illegal copy by a person having no legitimate title, the readout means control function of the security check means works to prevent the data from being unlawfully executed.

On the contrary, the release data storage medium is removably provided in the data processor, and hence only the legitimately entitled person is permitted to execute the trial data as long as the person having the legitimate title secretly holds the release data storage medium. This means that by loading the release data storage medium into the data processor, there can be released the readout means control function of the security check means. Thus, if after such release, the data processor is loaded with the main data storage medium not subjected to a predetermined processing due to the circumstances, for example, that it is under trial manufacture, the main data can be put into execution.

In the invention as defined in claim 3, the ID data input through the input means from the release data storage medium are detected by the ID detection means and stored into the ID storage means. Then, the ID data input through the input means from the main data storage medium are detected by the ID detection means, and the ID data of the release data storage medium stored in the ID storage means are collated with the ID data of the main data storage medium by the ID collation means. If the ID data are coincident with each other, the readout means is allowed to be actuated to read out the main data input through the input means from the main data storage medium. The main data are then fed to the execution means and can be put into execution by the execution means.

Reversely, if the ID data are uncoincident with each other, the readout means is not permitted to be actuated. Accordingly, the main data are not read out by the readout means even if the main data are input through the input means from the main data storage medium. Thus, the main data are not to be executed.

In the invention as defined in claim 4, the release data input through the input means from the release data storage medium are used to perform an on/off action of the flag stored in the flag storage means. With the flag on, the actuation of the security check means can be controlled so as to implement the release means by a programming procedure.

In the invention as defined in claim 5, the release data and the ID data are first input through the input means from the release data storage medium. Then, as described above, the release data will release the function of the security check means, allowing the ID data to be stored in the ID storage means. Thereafter, the game program data and ID data are input through the input means from the main data storage medium. At that time, as described above, if the ID data stored in the ID storage means are coincident with the ID data in the main data storage medium, the readout means will be actuated to read out a game program data, allowing the execution means to execute the game.

Inversely, if the ID data are not coincident with each other, the readout means will not be actuated to read out the game program data, with the result that the game is not to be executed.

In the invention as defined in claim 6, first by loading the CD-ROM for release data into the CD-ROM drive, as described above, are performed a release of the function of the security check means and a storage of the ID data. Then, the CD-ROM for main data is loaded into the CD-ROM drive (in other words, the CD-ROM's are exchanged) to thereby read out and execute the game program data as described above.

BRIEF DESCRIPTION OF THE DRAWINGS

The above and other features and advantages of the present invention will become more apparent from the following description in conjunction with the accompanying drawings, in which.

DESCRIPTION OF THE PREFERRED EMBODIMENTS

1. Embodiment

An embodiment of the present invention defined in claims 1 through 6 will now be described with reference to the drawings. A readout means in claim 1 can be a program data readout means; release data KEY-CD data; a storage medium for main data a trial CD or a commercial CD; and a storage medium for release data a KEY-CD. ID data in claim 3 can be KEY-ID and DISC-ID, while a flag in claim 4 a security flag. A predetermined processing applied to main data in claim 1 means an action of inserting a special code into the same CD.

An apparatus of this embodiment is intended to be implemented on a computer of a video game machine, and a set of functions of the apparatus can be implemented by operating the computer using a predetermined procedure represented in the form of a program. It is however to be appreciated that all or part of the functions of the apparatus may be implemented on a dedicated electronic circuit. A set of functions of the apparatus will be described hereinbelow with reference to a block diagram represented in terms of means as well as a virtual circuit block diagram depicting a hardware configuration. It is to be noted that a circuit of the game machine serving as a game implementation means in this embodiment is configured in accordance with the prior art techniques, and hence the description thereof will be omitted.

1-1. Configuration

Figure 1:
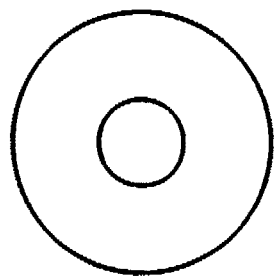
FIG. 1 is an explanatory diagram showing a data configuration in a trial CD for use in an embodiment of the present invention.

A configuration of this embodiment will now be explained in detail. First, explanation will be given of a data configuration within a CD-ROM in the process of trial manufacture (hereinafter referred to as a trial CD 1). Referring to FIG. 1, the trial CD 1 is shown including game program data 1d together with an identifier DISC-ID 1b differing depending on the manufacturer. For the purpose of saving time and labor required for the manufacture and improving the working efficiency, the trial CD includes no special codes. In order to enable such a trial CD 1 without a special code to execute a program, in this embodiment, another CD-ROM (hereinafter referred as a KEY-CD 2) different from the trial CD 1 is used. That is, the KEY-CD 2 is first set into a CD drive of the game machine so that the data in the KEY-CD 2 are read out to thereby allow the function of a security check means to be released. Afterwards, the KEY-CD 2 within the CD drive is replaced with the trial CD 1 of which data are in turn read out.

Figure 2:
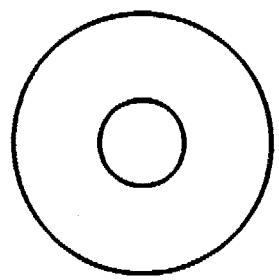
FIG. 2 is an explanatory diagram showing a data configuration in a KEY-CD for use in an embodiment of the present invention.

Then, description will be given of a data configuration within the KEY-CD 2 used for such release of the function of the security check means. Referring to FIG. 2, the KEY-CD 2 is shown including a special code 2a not permitting any analysis or copy without using a dedicated apparatus. The special code 2a is data in response to which input the security check means provided in a commercial game machine will permit the readout of a game program in the same manner as in the conventional example. Within the KEY-CD 2 is also stored an identifier KEY-ID 2b differing depending on the manufacturer of the game program. The identifiers KEY-HE 2b and DISC-ID 1b of the same manufacturer are correspondent with each other. Within the KEY-CD 2 is further stored KEY-CD data 2c serving to release the security check means function for checking the presence of absence of a special code. The KEY-CD 2 may store additional program data 2d.

Figures 3, 4:
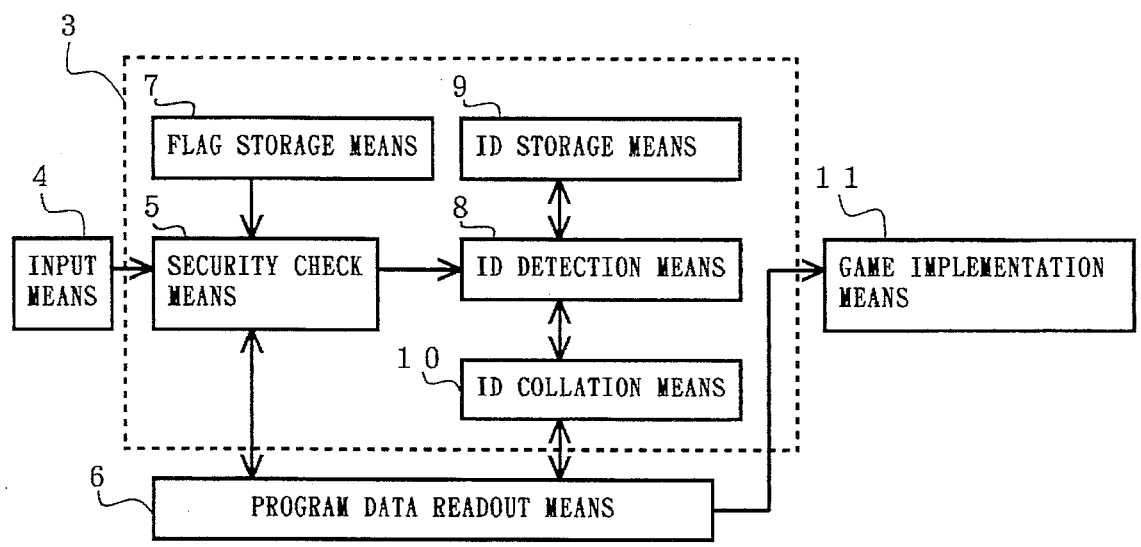
FIG. 3 is a block diagram depicting a configuration of an embodiment of the present invention.
FIG. 4 is an explanatory diagram depicting the contents of a flag storage means in the FIG. 3 embodiment.

On the contrary, a security section 3 provided in the game machine is configured as follows. As shown in FIG. 3, an input means 4 for inputting information stored in the CD-ROM is connected via a security check means 5 to a program data readout means 6. The security check means 5 serves a function to check the presence or absence of a special code within the CD to control the readout of program data by the program data readout means 6. The program data readout means 6 is coupled to a game implementation means 11. The program data readout means 6 serves to read out program data stored in the CD to provide as its output to the game implementation means 11.

The security check means 5 is further coupled to an HE detection means 8 for detecting the identifiers DISC-HE 1b AND KEY-HE 2b contained in the CD. The ID detection means 8 is coupled to an ID storage means 9 for storing the KEY-ID 2b detected. The ID detection means 8 is coupled to an ID collation means 10 for collating the DISC-ID 1b detected with the KEY-ID 2b stored in the ID storage means 9, the ID collation means in turn being coupled to the program data readout means 6.

A flag storage means 7 is coupled to the security check means 5. As shown in FIG. 4, the flag storage means 7 stores a security flag 7a and a readout enabling flag 7b. A flag refers herein to an indicator for controlling a switch point on a program. The security flag 7a, when it is on, allows the special code check function of the security check means 5 to be in ready state. The readout enable flag 7b, when it is on, allows the program data readout function of the program data readout means 6 to be in ready state. It will be noted that the following setting is previously made in accordance with a predetermined program so as to ensure the execution of a procedure indicated in Operation which will be descried later. Immediately after energizing the game machine body, the security flag 7a and the readout enabling flag 7b are respectively set to be on and off, whereas once the identifier KEY-ID 2b is stored into the ID storage means, the security flag 7a and the readout enabling flag 7b result in off and on, respectively, by virtue of the KEY-CD data 2c. In addition, when the identifiers KEY-ID 2b and DISC-ED 1b have been coincident with each other as a result of collation, the readout enabling flag 7b is set to become on.

Figure 5:
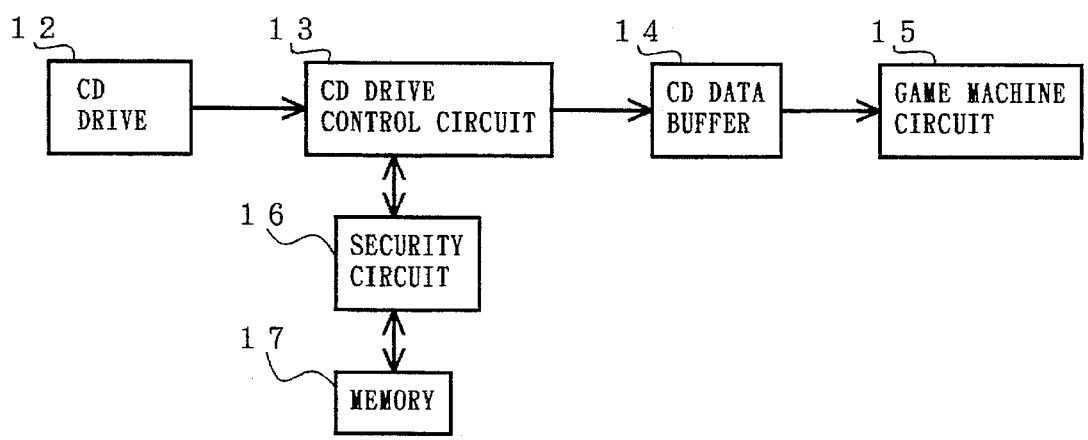
FIG. 5 is a circuit block diagram in the FIG. 3 embodiment.

Description will now be given of a simplified diagram of a hardware configuration in accordance with this embodiment. Referring to FIG. 5, used as the input means 4 is a CD-ROM drive (hereinafter referred to as a CD drive 12). The CD drive 12 is coupled to a CD drive control circuit 13 for implementing the program data readout means 6. The CD drive control circuit 13 is connected through a CD data buffer 14 to a game machine circuit 15 acting as the game implementation means 11.

With the CD drive circuit 13 is coupled a security circuit 16 for implementing the security check means 5, the ID detection means 8 and the ID collation means 10. With the security circuit 16 is coupled a memory 17 for implementing the flag storage means 7 and the ID storage means 9.

1-2. Operation

Figure 6:
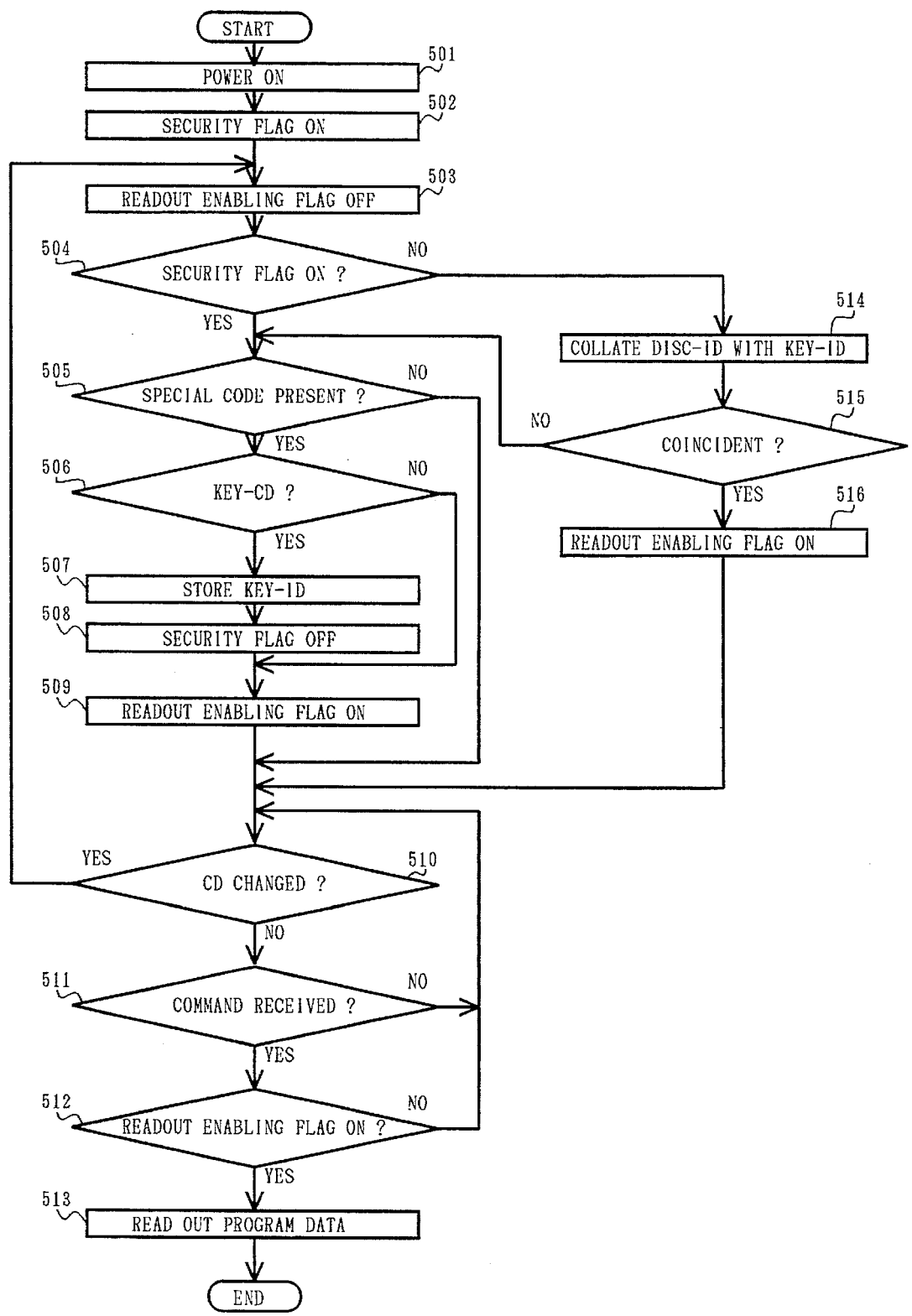
FIG. 6 is a flowchart illustrating a procedure of the processing in FIG. 3 embodiment.
Figure 7:
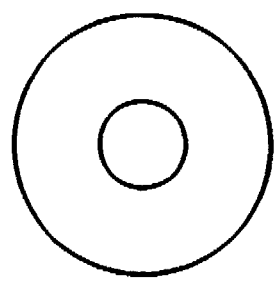
FIG. 7 is an explanatory diagram illustrating a data configuration of a commercial CD.

Operation of this embodiment having the above configuration will now be described with reference to a flowchart of FIG. 6 depicting a procedure. First of all, the power is turned on (step 501). Then, the security flag 7a becomes on (step 502) and the readout enabling flag 7b becomes off (step 503). Then, when the user sets the KEY-CD 2 into the CD drive 12, the security flag 7a is checked by the security check means 5 (step 504). Since the security flag 7a is on in this case, control advances to step 505 in which the security check means 5 checks whether the special code 2a is present or not. Since the set KEY-CD 2 includes the special code 2a, control advances to step 506 in which the ID detection means judges whether the set CD is the KEY-CD 2 or not. The set CD is judged to be the KEY-CD 2 when both the judgment of the presence or absence of the special code 2a in step 505 and the detection (judgment of the presence or absence) of the KEY-ID 2b by the ID detection means 8 are positive. Upon detecting the KEY-ID 2b from the KEY-CD 2 in this manner, the thus detected KEY-ID 2b is stored in the ID storage means 9 (step 507). After the storage of the KEY-ID 2b into the ID storage means 9, the KEY-CD data 2c will cause the security flag 7a to be off (step 508) and then the readout enabling flag 7b on (step 509).

Then, when the user replaces the KEY-CD 2 within the CD drive 12 with the trial CD 1, the replacement of the CD is detected in step 510, followed by the return to the step 503 to repeat the subsequent processing. Since in this case the security flag 7a has already become off in the step 508, control jumps from the step 504 to step 514. At that time, the DISC-ID 1b within the trial CD 1 is detected by the ID detection means 8. By the ID collation means 10, the thus detected DISC-ID 1b is collated with the KEY-ID 2b stored in the ID storage means 9 (step 514). If the DISC-ID 1b and the KEY-ID 2b coincide with each other due to the ID's from the same source (step 515), control advances to step 516 step in which the readout enabling flag 7b is allowed to become on.

Thereafter, the trial CD 1 remains unchangedly set in the CD drive 12, and hence it is judged in the step 510 that no CD change has taken place, resulting in the advancement to step 511. In step 511, if the program data readout means 6 has received a readout command derived from a predetermined program, then control advances to step 512, whereas if not, it returns to step 510. After the reception of the command, it is checked in step 512 whether the readout enabling flag 7b is on or not. Since in the step 516 the readout enabling flag 7b results in on as long as the DISC-ID 1b of the trial CD 1 is coincident with the KEY-ID 2b of the KEY-CD 2, control advances to step 513. Through the above procedure, the program data 1a within the trial CD 1 are allowed to be read out by the program data readout means 6 (step 513), whereby the game program is output to the game machine circuit 15 to implement the game.

If in the step 515 the DISC-ID 1b of the trial CD 1 is not coincident with the KEY-ID 2b of the KEY-CD 2, then control returns to the step 505. At that time, since the trial CD 1 includes no special codes, control jumps to the step 510, leaving the readout enabling flag 7b off. Then, in the step 512 the readout enabling flag 7b is judged to be off, causing control to return to 510. Thus, the readout of the program data 1d is prohibited until the trial CD 1 having the DISC-ID 1b coincident with the KEY-ID 2b is set into the CD drive 12.

It is to be appreciated that this embodiment will naturally allow the commercial CD 18 to be set for the implementation of a game in the same manner as in the conventional example. The following is a procedure needed to implement the game by setting the commercial CD 18 into the CD drive 12. Due to the fact that the commercial CD 18 inherently includes the special code 18a, control passes through the steps 501 to 505 in the same manner as the above example. Then, it is judged in the step 506 the commercial CD 18 set into the CD drive 12 is not the KEY-CD due to the lack of the KEY-ID, and hence control jumps to the step 509 causing the readout enabling flag 7b to be on. The subsequent procedure is substantially the same as the case of the above trial CD 1. Since the readout enabling flag 7b results in on in the step 509 as described above, the readout of the program data 18d can be performed through the steps 510 to 513.

In case of an illegally copied CD-ROM (hereinafter referred to as an illegal copy CD), the readout of the program data is restricted under the following procedure. Above all, the illegal copy CD has no special codes inserted therein. Even if such illegal copy CD is set into the CD drive 12, the procedure from the step 501 to the step 504 will be executed in the same manner as the above example. However, it is judged in the step 505 whether the special code is present or not, resulting in the jump to step 510 due to the lack of the special code. The subsequent procedure is the same as the case of the trial CD until it is checked in the step 512 that the readout enabling flag 7b remains off. In consequence, the readout of the program data is not permitted.

1-3. Effect

The effect of this embodiment as described hereinbefore is as follows. The provision of this embodiment into the commercial game machine will ensure that the special code check function of the security check means 5 is switched off by use of the KEY-CD 2, whereupon the game can be executed regardless of the trial CD 1 having no special codes. Accordingly, in the process of the development of a game software, an experimentally created game can be readily executed using the commercial game machine to test or confirm the game, thereby ensuring an effective and smooth development.

Also, due to the lack of the special code, the illegal copy CD is not permitted to implement the game on the commercial game machine without using KEY-CD 2, thereby preserving the security of the game program.

Alternatively, the release means may be implemented by a mechanical switch. However, the implementation thereof by flag on and off which is a programming technique will ensure an easier change in setting.

Furthermore, unless the KEY-ID 2b stored in the KEY-CD 2 is coincident with the DISC-ID 1b in the trial CD 1, the game is not permitted to be put into execution. Accordingly, if respective development manufacturers or respective developers have an individually different KEY-CD 2, it is impossible to use the KEY-CD 2 as a master key capable of reading every CD's, thereby highly increasing the security.

Also, a single KEY-CD 2 conveniently stores both the KEY-CD data 2c for releasing the function of the security check means 5 and the KEY-ID 2b for ID collation, which will contribute to the time-saving input of the KEY-CD data 2c and the KEY-ID 2b. In addition, a single trial CD 1 advantageously stores both the game program data 1D and the DISC-ID 1b, which will eliminate the necessity to separately input the DISC-ID 1b and the program data 1d. This will ensure an easy and prompt check of the trial CD 1 by the developer as well as an improved efficiency of the game development.

2. Other Embodiments

It is to be construed that the present invention is not limited to the above-described embodiment, and the connection, arrangement, setting, etc., of each function block may be appropriately modified. For instance, the program data 2d does not necessarily need to be provided within the KEY-CD 2. To further increase a reliability of security, a plurality of DISC-ID's 1b and a plurality of KEY-ID's 2b may be respectively provided within the trial CD 1 and the KEY-CD 2 so that the program data are not to be read out without coincidence of all the ID's.

In the case of requiring only the security based on the special code, a setting may be employed in which no use is made of the above-described DISC-ID 1b and the KEY-ID 2b. In this case, there is no need to store the ID's within the CD-ROM's and to provide the game machine with the ID detection means 8, whereupon the KEY-CD 2 can be used as if a so-called master key.

Further, the data security apparatus of the present invention is applicable not only to the game machines but also to ordinary computers. Therefore, besides the CD-ROM the storage medium can be, for instance,. a ROM cartridge, a ROM board, a floppy disk, a RAM card, a magnetic tape, a magneto-optic disc. Also, other than the CD drive 12 the input means 4 can be, for instance, a floppy disc drive, a RAM card drive, a magnetic tape drive, an optical disc drive, or a magnetic disc drive.

The storage means such as the flag storage means 7 and ID storage means 9 can be implemented in a free manner, for instance, may be implemented on a main memory or on an external memory. Alternatively, a CPU register or a cash memory is also available. The memories 17 to implement thereon the flag storage means 7 and the ID storage means 9 may be the same or different in type.

In addition to the flag on/of implementation, the release means can be implemented using other programming techniques or using the mechanical switch as described earlier.

Moreover, it is also possible for the steps constituting each procedure in this embodiment to change the sequence of execution, or to perform a simultaneous execution of a set of steps, or to execute the set of steps in different sequence, insofar as it is allowable in the light of their natures.

3. Effect of the Invention

According to the present invention as described hereinabove, a release means is provided for temporarily releasing the function of the security check means, to thereby propose a data security apparatus capable of securely preventing data stored in a storage medium from being illegally executed, analyzed, or copied by a person not having a legitimate title, while simultaneously facilitating the execution of the data by a person having the legitimate title.

What is claimed is:

1. A data security apparatus for controlling whether program data stored in a replaceable, external storage medium is to be processed by a data processor, the data security apparatus comprising:

a security check means for detecting the presence or absence of a security code stored in an external storage medium;

an internal storage means for storing an identification code read out from the external storage medium;

a replacement detect means for detecting a replacement of the external storage medium with a second external storage medium;

a judgment means for comparing the identification code stored in the internal storage means with an identification code read out from the second external storage medium and judging whether the codes correspond;

a control means for controlling whether the program data stored in the external storage medium or the second external storage device is to be processed by the data processor or not;

wherein, when the presence of the security code in the external storage medium is detected by the security check means, and the replacement means detects a replacement of the external storage medium with the second external storage medium, and the judgment means judges that the identification code stored in the internal storage means and the identification code read out of the second external storage medium correspond, then the security check means does not check the second external storage medium for the security code and the control means permits the program data stored on the second external storage medium to be processed by the data processor, and when the absence of the security code in the external storage medium is detected by the security check means, and the replacement means detects a replacement of the external storage medium with the second external storage medium, the security check means checks the second external storage medium for the security code, and when the external storage medium has a security code but does not have an identification code, and the replacement means detects a replacement of the external storage medium with the second external storage medium, the security check means checks the second external storage medium for the security code, and when the presence of the security code in the external storage medium is detected by the security check means, and the replacement means does not detect a replacement of the external storage medium with the second external storage medium, then the control means permits any program data stored on the external storage medium to be processed by the data processor.

2. The data security apparatus of claim 1, wherein the control means comprises:

an indicator flag for controlling the operation of the security check means; and a flag storage means for storing the indicator flag, wherein the indicator flag has two values, one value for causing an operation of the security check means and one value for inhibiting an operation of the security check means.

3. The data security apparatus of claim 2, wherein the data processor is a game machine having a computer, the program data is a game program for execution on the game machine, and the security check means, internal storage means, replacement detect means, judgment means, control means and flag storage means are implemented on the game machine's computer.

4. The data security apparatus of claim 3, wherein the external storage medium is a CD-ROM.

5. The data security apparatus of claim 3, wherein an external storage medium having a security code and an identification code stored thereon is used to set the control means to allow the execution of program data stored on a second external storage medium, the second external storage medium having an identification code and program code, but no security code.

6. The data security apparatus of claim 3, wherein the control means allows program data stored on an external storage medium to execute on the game machine if the external storage medium has a security code stored thereon.

7. The data security apparatus of claim 1, wherein an external storage medium has a plurality of identification codes, the internal storage means stores a plurality of identification codes read out from the external storage medium, and the judgment means compares the plurality of identification codes stored in the internal storage means with the plurality of identification codes read out the external storage medium and judges whether the plurality of codes correspond.

8. A data security apparatus for controlling whether program data stored in a replaceable, external storage medium is to be processed by a data processor, the data security apparatus comprising:

a security check means for detecting the presence or absence of a security code stored in an external storage medium;

a replacement detect means for detecting a replacement of a first external storage medium with a second external storage medium;

data readout control means for controlling the transfer of program data from the first or second external storage medium to the data processor;

wherein when the presence of the security code is detected by the security check means in the first external storage medium and the replacement detect means detects a replacement of the first external storage medium, the data readout control means transfers the program data from the second external storage medium to the data processor without performing a security check on the second external storage medium, and when the absence of the security code is detected by the security check means in the first external storage medium and no replacement is detected, then the data readout control means does not transfer the program dam to the data processor, and when the absence of the security code is detected by the security check means in the first external storage medium and the replacement means has detected a replacement of the first external storage medium, then the security check means checks the second external storage medium for the security code, and when the presence of the security code is detected by the security check means in an external storage medium and the replacement detect means has not detected a replacement of the external storage medium, the data readout control means transfers any program data stored on the external storage medium to the data processor.

9. The data security apparatus of claim 8 further comprising:

an identification code storage means for storing an identification code read out from the first external storage medium; and a judgment means for comparing the identification code stored in the identification storage means with an identification code read out from the second external storage means and for judging whether the codes correspond;

wherein when the presence of the security code in the external storage medium is detected by the security check means, and the replacement means detects a replacement of the first external storage medium with the second external storage medium, and the judgment means judges that the identification code stored in the identification code storage means and the identification code read out of the second external storage medium correspond, then the security check means does not check the second external storage medium for the security code and the data readout control means permits the program data stored on the second external storage medium to be processed by the data processor, and when the absence of the security code in the first external storage medium is detected by the security check means, and the replacement means detects a replacement of the first external storage medium with the second external storage medium, the security check means checks the second external storage medium for the security code, and when the first external storage medium has a security code but does not have an identification code, and the replacement means detects a replacement of the first external storage medium with the second external storage medium, the security check means checks the second external storage medium for the security code, and when the presence of the security code in the first external storage medium is detected by the security check means, and the replacement means does not detect a replacement of the first external storage medium with the second external storage medium, then the data readout control means permits any program data stored on the first external storage medium to be processed by the data processor.

10. The data security apparatus of claim 9, wherein the data readout control means comprises:

an indicator flag for controlling the operation of the security check means; and a flag storage means for storing the indicator flag, wherein the indicator flag has two values, one value for causing an operation of the security check means and one value for inhibiting an operation of the security check means.

11. The data security apparatus of claim 10, wherein if the first external storage medium has a security code and an identification code, and the identification code on the second external storage medium corresponds to the identification code of the first external storage medium, then the indicator flag is set to the value for inhibiting an operation of the security check means, such that when the first external storage medium is replaced by the second external storage medium, no security check is performed on the second external storage medium.

12. The data security apparatus of claim 10, wherein the external storage medium is a CD-ROM.

13. The data security apparatus of claim 10, wherein an external storage medium having a security code and an identification code stored thereon is used to set the data readout control means to allow the execution of program data stored on a second external storage medium, the second external storage medium having an identification code and program code, but no security code.

14. The data security apparatus of claim 10, wherein the data readout control means allows program data stored on an external storage medium to execute if the external storage medium has a security code stored thereon.

15. A data security method for determining whether program data stored in a replaceable, external storage medium is to be processed by a data processor, the data security method comprising the steps of:

determining whether a security code is stored in a first external storage medium;

reading an identification code from the first external storage medium and storing the identification code in an identification storage means;

detecting a replacement of the first external storage medium with a second external storage medium;

reading an identification code from the second external storage medium;

comparing the identification code stored in the identification code storage means with the identification code from the second external storage means and determining whether the identification codes correspond; and transferring the program data from the second external storage medium to the data processor without determining whether a security code is stored on the second storage medium when the identification codes correspond.

16. A data security method for allowing program data stored on a storage medium to execute on a data processing machine, the data processing machine having a hardware security apparatus, wherein the storage medium does not have a required security code stored thereon as required by the security hardware apparatus, the data security method comprising the steps of:

detecting a key external storage medium attached to the data processor, the key external storage medium comprising a security code; and detecting a replacement of the key external storage medium with a program data storage medium, the program data storage medium comprises program data;

wherein the key external storage medium disables the hardware security apparatus, such that the hardware security apparatus does not check the program data storage medium for the required security code, and the program data stored on the program data storage medium is executed on the data processor.

17. The data security method of claim 16, wherein the key external storage medium further comprises an identification code and the program data storage medium further comprises an identification code, such that a key external storage device is detected based on a presence of the security code and the identification code, and a program data storage medium is detected based on a presence of the identification code.

18. The data security method of claim 17, wherein the key external storage medium and the program data storage medium are CD-ROMs and the data processor is a video game machine.

* * * * *